United States Patent [19]
Dumbaugh, Jr.

[11] 3,804,646
[45] Apr. 16, 1974

[54] VERY HIGH ELASTIC MODULI GLASSES

[75] Inventor: William H. Dumbaugh, Jr., Painted Post, N.Y.

[73] Assignee: Corning Glass Works, Corning, N.Y.

[22] Filed: July 20, 1972

[21] Appl. No.: 273,435

Related U.S. Application Data

[63] Continuation-in-part of Ser. No. 832,467, June 11, 1969, abandoned.

[52] U.S. Cl. .................................... 106/52, 106/50
[51] Int. Cl. .......................... C03c 13/00, C03c 3/04
[58] Field of Search ........................ 106/50, 52

[56] References Cited
UNITED STATES PATENTS

| | | | |
|---|---|---|---|
| 3,060,041 | 10/1962 | Lowewenstein | 106/50 |
| 3,459,568 | 8/1969 | Rinehart | 106/50 |
| 3,573,078 | 3/1971 | Bacon | 106/50 |
| 3,044,888 | 7/1962 | Provance | 106/50 |
| 2,805,166 | 9/1957 | Loffler | 106/52 |

OTHER PUBLICATIONS

Searle, A. B.–Refractory Materials–London (1950), pgs. 93, 96.

*Primary Examiner*—Helen M. McCarthy
*Attorney, Agent, or Firm*—Kees van der Sterre

[57] ABSTRACT

This invention relates to beryllium-free silicate glasses exhibiting elastic moduli greater than about $16 \times 10^6$ psi and liquidus temperatures below about 1,350°C. More specifically, this invention relates to high elastic moduli glasses in the $MgO-Al_2O_3-SiO_2$ base composition field containing about 8–40 mole percent total of high field strength modifiers, essentially including $TiO_2$ and $La_2O_3$, $Ta_2O_5$ or $Y_2O_3$, selected from the group consisting of $TiO_2$, $La_2O_3$, $Ta_2O_5$, $Y_2O_3$, CaO and $ZrO_2$.

1 Claim, No Drawings

VERY HIGH ELASTIC MODULI GLASSES

This application is a continuation-in-part of my pending application Ser. No. 832,467, filed June 11, 1969, now abandoned.

The increasing emphasis on the development of very strong materials over the past decade has tremendously increased the appreciation of the importance of the elastic modulus (Young's modulus) of glasses. Hence, glasses demonstrating high elastic moduli are in great demand for applications wherein high strength and/or abrasion resistance are required such as: glass fiber reinforced structural material, laminated high strength materials, structures for use at great depths under water, and razor blades.

Considerable research has been undertaken in the recent past to develop glasses exhibiting elastic moduli higher than about $14 \times 10^6$ psi. Three reports of such work are: "The Development of Glass Fibers Having High Young's Moduli of Elasticity," W. Capp and D. H. Blackburn, National Bureau of Standards Report No. 5188, Apr. 1, 1957; "Studies in the Composition and Structure of Glasses Possessing High Young's Moduli," K. S. Lowenstein, Phys. Chem. Glasses, 2, 69 (1961); and "High-Modulus Glasses Based on Ceramic Oxides," S. D. Brown and G. Y. Onoda, Bureau of Naval Weapons—Department of the Navy Report R-6692, October, 1966. This last and most recent report is of particular interest since it summarizes the literature available in the field as well as reporting on work performed by the authors with calcium aluminate glasses. Thus, the writers noted: (1) the highest elastic modulus values which had been observed in silicate glasses did not exceed about $12.5 \times 10^6$ psi; (2) beryllia appeared to be a necessary component of any truly high modulus silicate glass; and (3) calcium aluminate glasses containing no beryllia demonstrate modulus values comparable to silicate glasses that do contain beryllia. Brown and Onoda reported glasses in the calcium aluminate composition field with elastic moduli values approaching $16 \times 10^6$ psi without the inclusion of beryllium therein.

The literature has repeatedly pointed out that glasses exhibiting high elastic moduli can be obtained only where the concentration of network former, e.g. silica, is maintained as low as possible and the concentration of modifying ions of high field strength is maintained as great as possible. Unfortunately, however, this composition combination also commonly yields glasses demonstrating high liquidus values, sharply steep viscosity-temperature curves, and a very low viscosity in the melting and forming ranges. For these reasons, glass melting is difficult, glass quality is generally poor, and glass forming is extremely difficult if not impossible. Also, whereas beryllium oxide has been found to be the best modifier for the enhancement of the elastic modulus of glass, it is extremely toxic so its use in a glass-forming batch has generally been limited to the laboratory.

Therefore, the principal object of this invention is to provide silicate glasses which will exhibit elastic moduli in excess of $16 \times 10^6$ psi, which are essentially free from beryllium oxide.

I have discovered that elastic moduli greater than $16 \times 10^6$ psi can be achieved in glasses in the magnesium aluminosilicate composition system which contain 8–40 mole percent total of high field strength modifiers selected from the following group in amounts not exceeding the indicated proportions: 25 mole percent $TiO_2$, 25 mole percent $La_2O_3$, 10 mole percent $Ta_2O_5$, 20 mole percent $Y_2O_3$, 10 mole percent CaO and 15 mole percent $ZrO_2$, wherein $TiO_2$ comprises at least about 2.5 mole percent and the total of $La_2O_3 + Ta_2O_5 + Y_2O_3$ comprises at least about 2 mole percent. The composition of the base $MgO$-$Al_2O_3$-$SiO_2$ glass ranges in mole percent from about 5–40 percent MgO, 5–30 percent $Al_2O_3$ and 25–60 percent $SiO_2$. My preferred glasses consist essentially, in mole percent on the oxide basis, of about 15–36 percent MgO, 10–20 percent $Al_2O_3$, 35–50 percent $SiO_2$ and 10–30 percent total of high field strength modifiers as above described, with glasses comprising 3–18 mole percent $TiO_2$ and 2–10 percent $La_2O_3$ among the selected high field strength modifiers being particularly preferred.

Table I records the compositions, in mole percent on the oxide basis, of several glasses coming within the parameters of my invention. The batch ingredients may comprise any materials, either the oxides or other compounds, which, on being melted together, are converted to the desired oxide in the proper proportions. Table II reports the actual batch ingredients, in parts by weight, utilized in the glasses of Table I. The batch ingredients were compounded together, melted in an electrically-heated furnace at 1,650°C. for four hours in platinum-20 percent rhodium crucibles, the melts then cast into steel molds to produce slabs about 5 inches × 5 inches × ½ inch, and, finally, the slabs transferred to an annealer operating at the appropriate temperature.

TABLE I

|  | 1 | 2 | 3 | 4 | 5 | 6 |
|---|---|---|---|---|---|---|
| $SiO_2$ | 44.4 | 43.7 | 43.6 | 44.4 | 39 | 45 |
| $Al_2O_3$ | 11.1 | 12.5 | 12.5 | 11.1 | 18 | 11 |
| MgO | 22.2 | 25.0 | 25.0 | 22.2 | 16 | 22 |
| CaO | 5.55 | 0.2 | 0.2 | 5.5 | 5 | 8 |
| $TiO_2$ | 5.55 | 6.2 | 6.2 | 5.6 | 10 | 3 |
| $La_2O_3$ | 5.55 | — | 6.2 | 8.3 | 7 | 8 |
| $Ta_2O_5$ | — | — | — | — | — | 3 |
| $Y_2O_3$ | 5.55 | 12.4 | 6.2 | 2.7 | 5 | — |

|  | 7 | 8 | 9 | 10 | 11 | 12 |
|---|---|---|---|---|---|---|
| $SiO_2$ | 35 | 45 | 41 | 35 | 39 | 39 |
| $Al_2O_3$ | 16 | 11 | 11 | 14 | 22 | 22 |
| MgO | 14 | 14 | 12 | 12 | 20 | 18 |
| CaO | 5 | 6 | 4 | 5 | 7 | 7 |
| $TiO_2$ | 18 | 14 | 25 | 22 | — | 2 |
| $La_2O_3$ | 7 | 7 | 7 | 12 | 7 | 7 |
| $Ta_2O_5$ | — | 3 | — | — | — | — |
| $Y_2O_3$ | 5 | — | — | — | 5 | 5 |

TABLE IA (Weight Percent)

|  | 1 | 2 | 3 | 4 | 5 | 6 |
|---|---|---|---|---|---|---|
| $SiO_2$ | 31.6 | 32.4 | 29.9 | 30.5 | 25.2 | 29.0 |
| $Al_2O_3$ | 13.4 | 15.7 | 14.5 | 12.9 | 19.7 | 12.0 |
| MgO | 10.6 | 12.4 | 11.5 | 10.2 | 6.9 | 9.5 |
| CaO | 3.7 | 0.1 | 0.1 | 3.5 | 3.0 | 4.8 |
| $TiO_2$ | 5.2 | 6.1 | 5.7 | 5.1 | 8.6 | 2.6 |
| $La_2O_3$ | 21.4 | — | 23.0 | 31.1 | 24.5 | 27.9 |
| $Ta_2O_5$ | — | — | — | — | — | 14.2 |
| $Y_2O_3$ | 14.1 | 34.3 | 15.3 | 6.7 | 12.1 | — |

|  | 7 | 8 | 9 | 10 | 11 | 12 |
|---|---|---|---|---|---|---|
| $SiO_2$ | 22.3 | 28.6 | 28.7 | 21.1 | 25.5 | 25.3 |
| $Al_2O_3$ | 17.3 | 11.9 | 13.1 | 14.3 | 24.4 | 24.2 |
| MgO | 6.0 | 6.0 | 5.6 | 4.9 | 8.8 | 7.8 |
| CaO | 3.0 | 3.6 | 2.6 | 2.8 | 4.3 | 4.2 |
| $TiO_2$ | 15.3 | 11.8 | 23.3 | 17.6 | — | 1.7 |
| $La_2O_3$ | 24.2 | 24.1 | 26.6 | 39.3 | 24.8 | 24.6 |
| $Ta_2O_5$ | — | 14.0 | — | — | — | — |
| $Y_2O_3$ | 12.0 | — | — | — | 12.3 | 12.2 |

TABLE II

|  | 1 | 2 | 3 | 4 | 5 | 6 |
|---|---|---|---|---|---|---|
| Dry Sand | 189.0 | 192.3 | 178.7 | 183.0 | 378.2 | 435.4 |
| Calcined $Al_2O_3$ | 80.7 | 93.7 | 87.2 | 78.2 | 299.5 | 182.7 |
| MgO | 63.1 | 74.7 | 69.5 | 61.1 | 105.7 | 145.0 |
| $CaCO_3$ | 39.4 | — | — | 38.0 | 80.9 | 129.3 |
| $TiO_2$ | 31.5 | 36.7 | 34.1 | 30.5 | 129.6 | 38.8 |
| $La_2O_3$ | 127.5 | — | 137.9 | 185.2 | 367.7 | 419.4 |
| $Ta_2O_5$ | — | — | — | — | — | 213.2 |
| $Y_2O_3$ | 151.6 | 205.7 | 95.6 | 42.8 | 191.4 | — |

|  | 7 | 8 | 9 | 10 | 11 | 12 |
|---|---|---|---|---|---|---|
| Dry Sand | 335.3 | 430.0 | 432.0 | 317.3 | 383.0 | 379.8 |
| Calcined $Al_2O_3$ | 263.1 | 180.4 | 199.0 | 217.8 | 370.8 | 367.6 |
| MgO | 91.56 | 91.1 | 86.06 | 74.16 | 133.8 | 119.3 |
| $CaCO_3$ | 79.84 | 96.0 | 70.43 | 75.53 | 114.8 | 113.7 |
| $TiO_2$ | 230.5 | 178.9 | 352.0 | 266.4 | — | 26.0 |
| $La_2O_3$ | 363.0 | 362.0 | 399.2 | 588.8 | 372.4 | 369.2 |
| $Ta_2O_5$ | — | 210.7 | — | — | — | — |
| $Y_2O_3$ | 189.2 | — | — | — | 193.9 | 192.2 |

Table III records various physical properties secured on the Examples in Tables I and II. The determinations thereof were obtained in accordance with measuring techniques conventional in the glass industry. Young's Modulus determinations were made in accordance with the standard resonance method (ASTM Designation C 623-71).

TABLE III

|  | 1 | 2 | 3 | 4 |
|---|---|---|---|---|
| Liquidus | 1236°C. | 1331°C. | 1249°C. | 1189°C. |
| Young's Modulus $\times 10^6$ psi | 17.4 | 19.3 | 18.8 | 16.8 |
| Annealing Point, °C. | 762 | 775 | 766 | 770 |
| Strain Point, °C. | 724 | 733 | 727 | 736 |
| Expansion Coefficient (25°–300°C.) $\times 10^{-7}$/°C. | 66.7 | 61.5 | 62.8 | 66.1 |
| Density, (g/cc) | 3.589 | 3.458 | 3.639 | 3.685 |
| Poisson's Ratio | 0.29 | 0.30 | 0.29 | 0.30 |
| Appearance | clear | clear | clear | clear |

|  | 5 | 6 | 7 | 8 |
|---|---|---|---|---|
| Liquidus | 1226°C. | 1239°C. | 1257°C. | 1236°C. |
| Young's Modulus $\times 10^6$ psi | 17.49 | 16.55 | 19.13 | 16.44 |
| Annealing Point, °C. | 762 | 751 | 761 | 736 |
| Strain Point, °C. | 725 | 712 | 724 | 697 |
| Expansion Coefficient (25°–300°C.) $\times 10^{-7}$/°C. | 62.9 | 63.7 | 65.6 | 58.2 |
| Density (g/cc) | 3.650 | 3.809 | 3.732 | 3.738 |
| Poisson's Ratio | 0.29 | 0.28 | 0.33 | 0.28 |
| Appearance | clear | clear | clear with crystals on part of surface | clear |

TABLE III—Continued

|  | 9 | 10 | 11 | 12 |
|---|---|---|---|---|
| Liquidus | 1252°C. | 1125°C. | — | 1399°C. |
| Young's Modulus ×10⁶ psi | 17.47 | 17.23 | — | 17.13 |
| Annealing Point, °C. | 739 | 755 | — | 775 |
| Strain Point, °C. | 703 | 718 | — | 734 |
| Expansion Coefficient (25°-300°C.) ×10⁻⁷/°C. | 64.3 | 68.8 | — | 60.4 |
| Density (g/cc) | 3.649 | 3.916 | — | 3.573 |
| Poisson's Ratio | 0.29 | 0.30 | — | 0.28 |
| Appearance | clear with crystals on surface | clear with crystals on surface | hazy with crystalline inclusions throughout | similar to #11, slightly better |

The above-delineated composition ranges are vital to the operability of my invention. Hence, with $SiO_2$ quantities less than about 20 mole percent the glasses become difficult to form in good quality whereas, at amounts greater than about 60 mole percent, the elastic modulus drops to below $16 \times 10^6$ psi. Where $Al_2O_3$ is utilized in quantities less than about 5 mole percent, the viscosity of the glass at the liquidus becomes too low and above 30 mole percent the liquidus is too high for reasonable melting techniques. At MgO contents less than 5 mole percent, the elastic modulus is below $16 \times 10^6$ psi and above 40 mole percent the liquidus becomes too high. Below about 8 mole percent of the high field strength modifiers the beneficial effects thereof on the elastic modulus are not appreciable, whereas above 40 mole percent the liquidus becomes too high.

The absence of ingredients other than the indicated proportions of MgO, $Al_2O_3$, $SiO_2$ and high field strength modifiers is to be preferred although minor amounts, totalling not more than about 10 mole percent, of various compatible metal oxides can be tolerated and, in some instances, e.g., ZnO and $Li_2O$, may be beneficial in tailoring physical properties for a specific application without significantly lowering the elastic modulus. Nevertheless, the addition of such glass formers as $B_2O_3$ and $P_2O_5$ and strong fluxes such as $Na_2O$, $K_2O$, and fluoride can have a severely deleterious effect on the elastic modulus, and, therefore, caution must be exercised in their use.

An examination of Table I in conjunction with Table III clearly illustrates the composition parameters of the invention. As is typical of compositions within the aforementioned ranges, all of the glasses have elastic moduli in excess of $16 \times 10^6$ psi and, quite importantly, all of the glasses have liquidus temperatures below about 1,350°C. and most have liquidus temperatures below 1,275°C. This combination of properties is due to the presence of titania and at least one oxide selected from the group consisting of $La_2O_3$, $Ta_2O_5$ and $Y_2O_3$.

Titania is a particularly critical constituent of the glasses of the present invention because it permits the liquidus to be maintained at a temperature below about 1,275°C. while still maintaining an elastic modulus of over $16 \times 10^6$ psi. Furthermore, as shown by the properties of Example 2 set forth in Table III, if some relaxation is permitted in the requirement of a low liquidus temperature, but still maintaining a liquidus below about 1,350°C., glasses having an elastic modulus of $18.5 \times 10^6$ psi or higher may be produced. However, at least about 2.5 mole percent titania is required, as shown by Examples 11 and 12 of Table I which are outside the scope of the present invention and Example 6 which is within. Thus, if less than about 2.5 mole percent titania is used, a good quality glass with a liquidus below 1,275°C. and an elastic modulus over $16 \times 10^6$ psi will not be obtained.

The presence of $La_2O_3$, $Ta_2O_5$ and/or $Y_2O_3$ is also important in controlling the liquidus temperature of the glass while maintaining a high elastic modulus. $La_2O_3$ in particular is preferred as being the most effective in lowering the liquidus without excessively affecting elastic modulus. Thus I particularly prefer glasses within the aforementioned composition ranges which include both 2–10 mole percent $La_2O_3$ and 3–18 mole percent $TiO_2$ among the high field strength modifiers. Compositions containing these modifiers can be formulated which have liquidus temperatures substantially below 1,250°C., demonstrating melting and forming characteristics which permit handling with presently-available commercial melting and forming techniques.

Therefore, this invention provides silicate glasses demonstrating elastic moduli in excess of $16 \times 10^6$ psi and even in excess of $19 \times 10^6$ psi which are essentially free from BeO and, hence, free from the toxicity problems inherent in the use of BeO as a batch material. Further, glasses having elastic moduli greater than $17 \times 10^6$ psi can be made from $MgO$-$Al_2O_3$-$SiO_2$-$La_2O_3$-$TiO_2$ compositions which exhibit commercially practical melting and forming characteristics.

I claim:

1. A beryllium-free glass exhibiting an elastic modulus in excess of $16 \times 10^6$ psi and a liquidus temperature below about 1,350°C. consisting essentially, in mole percent on the oxide basis, of about 12–25 percent MgO, 11–18 percent $Al_2O_3$, 35–45 percent $SiO_2$ and 18.8–39 percent of high field strength modifiers selected from the following group in amounts not exceeding the indicated proportions: 25 mole percent $TiO_2$, 25 mole percent $La_2O_3$, 10 mole percent $Ta_2O_5$, 20 mole percent $Y_2O_3$, 10 mole percent CaO and 15 mole percent $ZrO_2$, wherein said high field strength modifiers include at least about 3 mole percent $TiO_2$ and at least about 7 mole total of $La_2O_3 + Ta_2O_5 + Y_2O_3$.

* * * * *